No. 821,775. PATENTED MAY 29, 1906.
R. G. WOODWARD & C. McNEIL.
TUCK FORMING ATTACHMENT FOR SEWING MACHINES.
APPLICATION FILED JAN. 5, 1905.
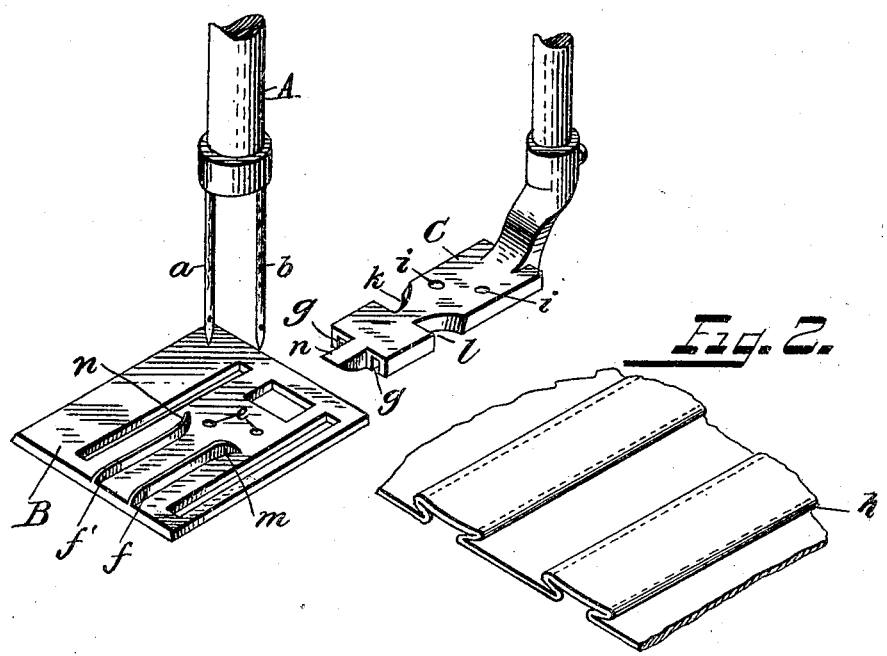
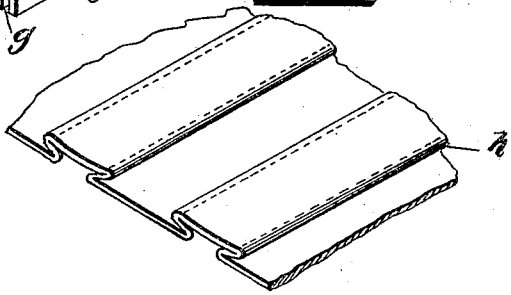
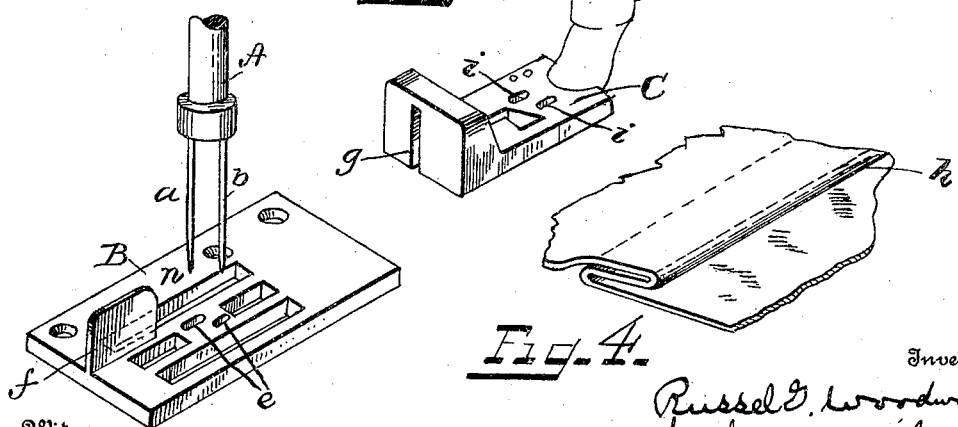
Witnesses
Franck L. Ourand
Grace P. Brereton
Inventors
Russel G. Woodward
Chester McNeil
By C. B. Sturtevant
Attorney

UNITED STATES PATENT OFFICE.

RUSSEL G. WOODWARD, OF WAUKEGAN, AND CHESTER McNEIL, OF CHICAGO, ILLINOIS, ASSIGNORS TO THE UNION SPECIAL MACHINE COMPANY, OF CHICAGO, ILLINOIS, A CORPORATION OF ILLINOIS.

TUCK-FORMING ATTACHMENT FOR SEWING-MACHINES.

No. 821,775.     Specification of Letters Patent.     Patented May 29, 1906.

Original application filed April 16, 1901, Serial No. 56,063. Divided and this application filed January 5, 1905. Serial No. 239,774.

*To all whom it may concern:*

Be it known that we, RUSSEL G. WOODWARD, residing at Waukegan, in the county of Lake, and CHESTER McNEIL, residing at Chicago, in the county of Cook, State of Illinois, citizens of the United States, have invented certain new and useful Improvements in Tuck-Forming Attachments for Sewing-Machines, of which the following is a description, reference being had to the accompanying drawings and to the letters of reference marked thereon.

This application is a division of our application filed April 16, 1901, Serial No. 56,063.

The present invention relates to a novel apparatus for forming tucks in fabrics; and it consists in the matters hereinafter described, and referred to in the appended claims.

The invention is illustrated in the accompanying drawings, in which—

Figure 1 is a perspective detached view of a presser-foot and throat-plate of a sewing-machine embodying our invention. Fig. 2 is a perspective view of the fabrics as tucked and sewed with the apparatus shown in Fig. 1; and Fig. 3 is a view similar to Fig. 1, illustrating an apparatus adapted to form a single tuck of width considerably greater than that shown in Fig. 1; and Fig. 4 is a perspective view of the fabric as tucked and sewed with the apparatus shown in Fig. 3.

As shown in Fig. 1, two needles *a b* are used, set so that a line joining them is oblique to the line of feed. It will be understood that suitable complemental stitch-forming mechanism coöperates with the needles.

A represents the needle-bar, carrying the needles.

B represents the throat-plate, having openings *e e* for the passage of the needles.

C represents the presser-foot, having grooves *g g* in its under side, in which fit raised fins or plates *f f'*, having guiding-tongues *m n* projecting into the cut-out portions *k l* of the presser-foot, which cut-away portions are in advance of the needle-openings *i* in the presser-foot.

When the material is inserted between the presser-foot and throat-plate and the presser-foot lowered, tucks *h* are formed in the material and are pressed down flat by the lower edges of the openings *k l* and sewed down by the stitches. The presser-foot has a forward projection *u*, which travels between the tucks.

The guiding-tongues *m n* aid in turning over the tucks, although they are not absolutely necessary.

As shown in Fig. 3, the fin or plate in the throat-plate and coöperating groove on the presser-foot are much deeper than as shown in Fig. 1, so as to make a tuck which is of width sufficient when deflected to lie in front of both needles and be sewed down by the stitch-forming mechanism, as shown in Fig. 4.

Having thus described our invention, what we claim, and desire to secure by Letters Patent, is—

1. In a sewing-machine, provided with a presser-foot and throat-plate and suitable stitch-forming mechanism, coöperating means on the presser-foot and throat-plate to form and guide a vertical tuck, and means to deflect the tuck to lie in a horizontal plane, said forming and guiding and deflecting means being in advance of the stitch-forming mechanism, substantially as described.

2. In a sewing-machine, provided with a presser-foot, throat-plate, and stitch-forming mechanism, means on the presser-foot coöperating with means on the throat-plate and in advance of the stitch-forming mechanism for forming and guiding a vertical tuck and means also on said presser-foot, in advance of the stitch-forming mechanism to deflect said vertical tuck to lie in a horizontal plane, substantially as described.

3. In a sewing-machine, provided with a presser-foot, having a groove on its under side and having a needle-opening, a throat-plate, having a fin or plate registering with the groove and having a needle-opening registering with that on the presser-foot, and a cut-out portion on said presser-foot, in advance of the needle-opening the walls of which cut-out portion deflect the tuck to horizontal position, substantially as described.

4. In a sewing-machine, provided with a presser-foot, having a groove on its under side and having a needle-opening, a throat-plate, having a fin or plate registering with the groove and having a needle-opening registering with that on the presser-foot, and a cut-out portion on said presser-foot, in advance of the needle-opening the walls of which cut-out portion deflect the tuck to horizontal position, said fin or plate having a guiding-tongue projecting into the cut-out portion, substantially as described.

5. In a two-needle machine, suitable stitch-forming mechanism, a presser-foot, vertically-arranged means located in advance of one of the needles to form a vertical tuck, means to guide said vertical tuck and means on said presser-foot to deflect said vertical tuck to lie in a horizontal plane, said vertical means forming a vertical tuck, which when laid out flat, will be sewed down by both needles; substantially as described.

6. In a two-needle machine, suitable stitch-forming mechanism, including a presser-foot and a throat-plate, coöperating means on the presser-foot and throat-plate to form and guide a vertical tuck, and means on the presser-foot to deflect said tuck to lie in a horizontal plane, said tuck-forming means being of sufficient capacity to form a tuck wider than the rows of stitching apart; substantially as described.

7. In a sewing-machine, suitable stitch-forming mechanism, including a needle, a presser-foot, means to form a vertical tuck, means to guide said tuck, means to deflect said tuck to lie in a horizontal plane, said deflecting means being located on the presser-foot between the needle and tuck forming and guiding means; substantially as described.

8. In a sewing-machine provided with a presser-foot and throat-plate, a stitch-forming mechanism including a plurality of needles, coöperating means on the presser-foot and throat-plate to form and guide a vertical tuck, and means to deflect the tuck to lie in a horizontal plane, said tuck-forming means being of sufficient capacity to form a tuck wider than the width of the seam, said forming and guiding and said deflecting means being in advance of the stitch-forming mechanism, whereby the tuck when laid out flat will be sewed down by both needles; substantially as described.

In testimony whereof we affix our signatures in presence of two witnesses.

RUSSEL G. WOODWARD.
CHESTER McNEIL.

Witnesses:
F. S. North,
A. B. Clothier.